United States Patent [19]
Dunn

[11] 3,904,339
[45] Sept. 9, 1975

[54] APPARATUS FOR DEPOSITING MATERIALS ON SURFACES OF REVOLUTION

[75] Inventor: John William Dunn, Sylvania, Ohio

[73] Assignee: Owens-Corning Fiberglas Corporation, Toledo, Ohio

[22] Filed: Oct. 1, 1973

[21] Appl. No.: 402,429

Related U.S. Application Data

[63] Continuation of Ser. No. 223,160, Feb. 3, 1972, abandoned.

[52] U.S. Cl. ............... 425/162; 118/7; 118/321; 264/309; 425/447
[51] Int. Cl. ............................................. B28b 17/00
[58] Field of Search. 118/7, 321; 264/309, DIG. 72; 425/60, 96, 162, 375, 470, 447

[56] References Cited
UNITED STATES PATENTS

| 2,344,108 | 3/1944 | Roselund | 118/323 |
| 2,838,024 | 6/1958 | Rekettye | 118/321 |
| 3,119,164 | 1/1964 | Cserny | 264/309 |
| 3,606,162 | 9/1971 | Lehmann | 118/7 |

Primary Examiner—Roy Lake
Assistant Examiner—Mark S. Bicks
Attorney, Agent, or Firm—Carl G. Staelin; John W. Overman; William P. Hickey

[57] ABSTRACT

Method and apparatus for depositing material on surfaces of revolution. The preferred embodiment deposits glass fibers and curable resin onto molds shaped to form the heads of storage tanks. The spray means for depositing the resin and fibers is supported on an arm which is pivoted about an axis which passes through the center of curvature for the surface of revolution. The spray means is moved over the surface of the mold at a speed which is generally proportional to its distance from the axis of revolution to give a generally uniform thickness of deposited material. Preferably, the arm on which the spray means is supported is in turn pivotally supported from a second arm. The arms may be rotated in unison, or the inner arm used to swing the joint between the arms over a center of curvature for a portion of a mold and the outer arm rotated about the joint for depositing material on a portion of the mold.

17 Claims, 7 Drawing Figures

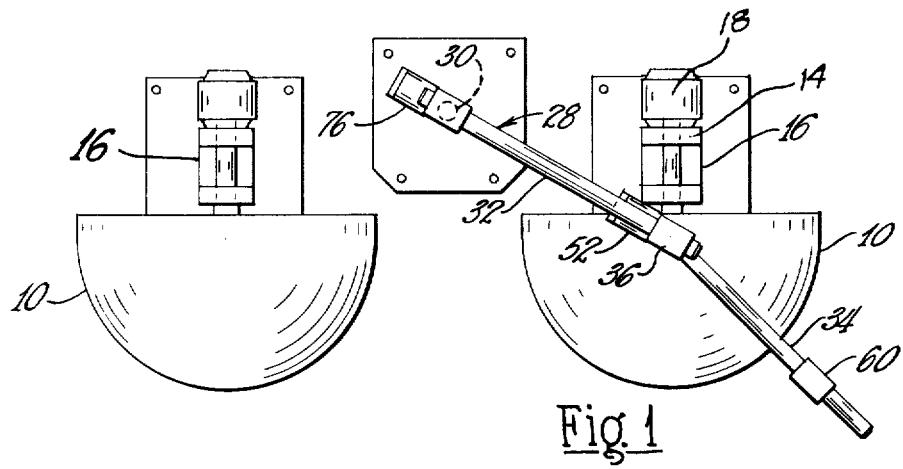
Fig. 1
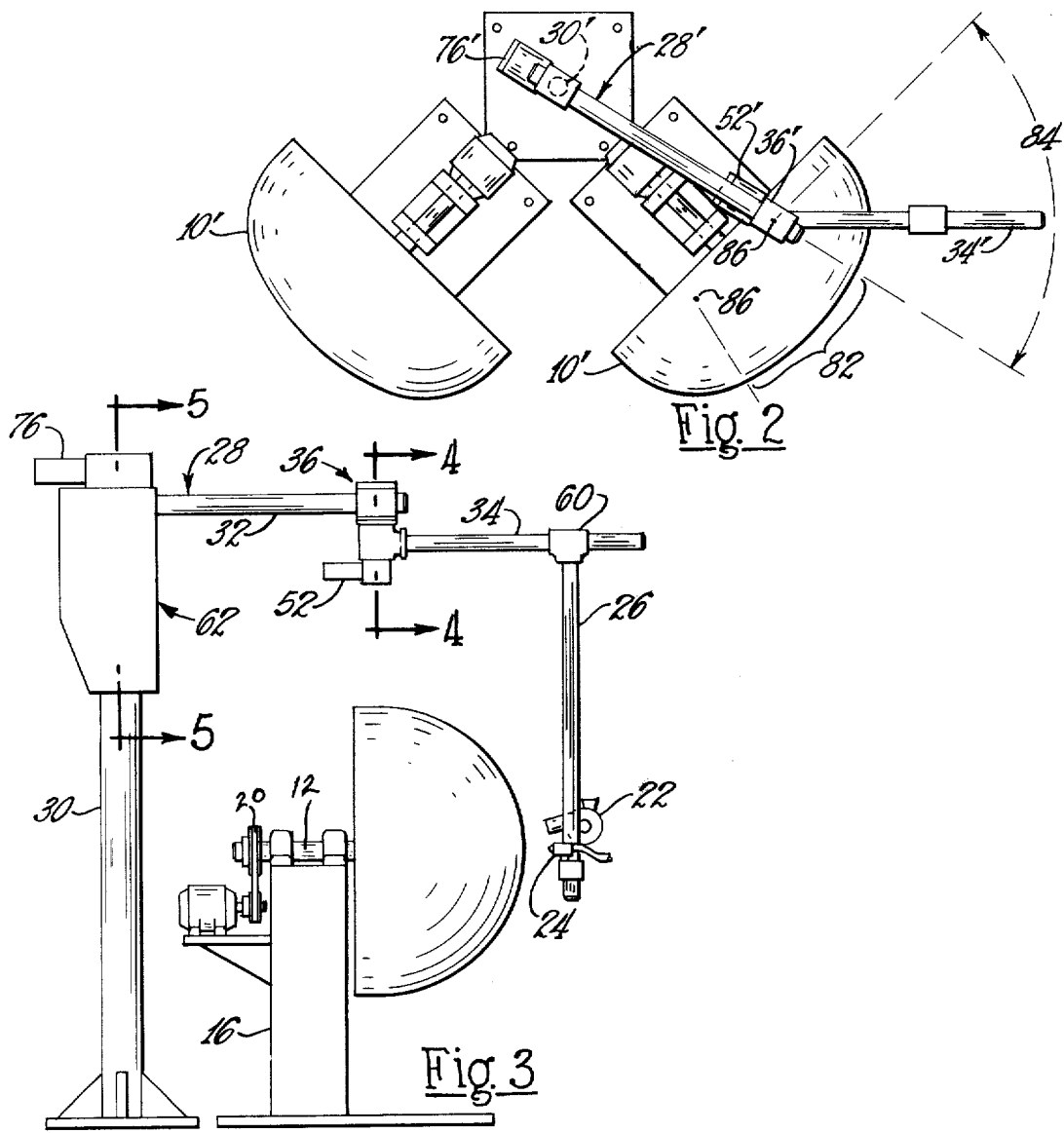
Fig. 2
Fig. 3

APPARATUS FOR DEPOSITING MATERIALS ON SURFACES OF REVOLUTION

This is a continuation of application Ser. No. 223,160, filed Feb. 3, 1972, and now abandoned.

BACKGROUND OF THE INVENTION

Heads for glass fiber reinforced plastic tanks have been made heretofore by spraying plastic and chopped fibers onto the exterior surface of a form which corresponds in shape to the inside of the head. Chopped fibers are produced by a small air driven chopper which ejects chopped fibers into a stream of droplets of the resin. The spray head and chopper have been moved manually over the mold while the mold revolved about its axis of revolution to build up a deposit which has been generally uniform. This process has required a lot of labor, and the results have not always been uniform.

In one instance it has been attempted to mount the spray gun on a floor track and move the spray gun and chopper by means of an air motor the air pressure to which was modulated by a tape control mechanism, this apparatus has not been successful and has not been a workable commercial device.

An object of the present invention is the provision of new and improved method and apparatus for depositing materials, and particularly a curable resin, onto a surface of revolution while it is being rotated about its axis of revolution to give a generally uniform deposition.

Another object of the invention is the provision of new and improved apparatus of the above described type which is completely automatic in that it moves the chopper and spray gun with a velocity that is generally proportional to its distance from the axis of revolution.

A further object of the invention is the provision of new and improved apparatus of the above described type that is devoid of rails and which moves the chopper and spray head back and forth to complete one head and then automatically moves to another form to repeat a similar operation.

Further objects and advantages of the invention will become apparent to those skilled in the art to which the invention relates from the following description of several preferred embodiments described with preference to the accompanying drawings forming a part of this specification.

BRIEF DESCRIPTION OF THE DRAWINGS

FIG. 1 is a schematic plan view of apparatus for performing the method of the present invention;

FIG. 2 is a fragmentary plan view of another embodiment of apparatus for performing the method of the present invention;

FIG. 3 is a side elevational view of the apparatus shown in FIG. 1;

DESCRIPTION OF THE PREFERRED EMBODIMENTS

Figure 4:
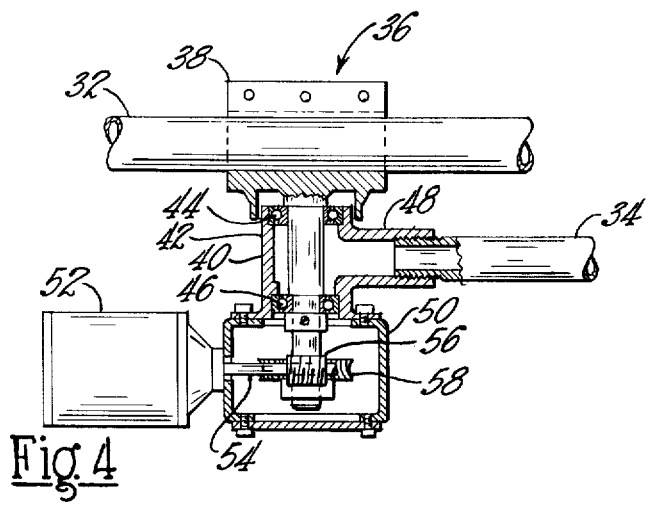
FIG. 4 is a fragmentary sectional view taken approximately on the line 4—4 of FIG. 3.

FIG. 1 of the drawings shows apparatus for performing the method of the present invention as used to make spherical heads. The apparatus shown in FIG. 1 comprises a pair of hemispherical molds 10 each of which is mounted on a shaft 12 which in turn is journaled by a pair of pillow blocks 14. The pillow blocks 14 are mounted on a pedestal 16, and the shaft 12 is slowly rotated by means of a motor 18 and belt drive 20. The apparatus shown can be used to distribute glass fibers and resin on the surface of one mold, and then proceed to distribute the glass fibers and resin on the surface of a second mold while the material on the first mold is hardening.

The apparatus for depositing materials onto the molds 10 comprises a glass strand chopper 22, and a resin spray head 24. The chopper 22 and spray head 24 are fastened together and are moved across a major diameter of the mold 10 by a depending leg 26 of an articulated arm 28. The articulated arm 28 is rotatably mounted upon a vertical support column 30 that is centered between the two pedestals 16. The articulated arm 28 comprises inner and outer arms 32 and 34 respectfully which are hinged together by the motor driven hinge 36. The motor driven hinge 36 comprises a clamp bracket 38 which surrounds the inner arm 32 and which can be slid longitudinally thereof and clamped in position. The clamp 38 carries a depending post 40 on which is journaled a sleeve 42 by means of antifriction bearings 44 and 46. The sleeve 42 is provided with a right angle boss 48 into which the outer arm 34 is threaded. A gear casing 50 is bolted to the bottom of the sleeve 42, and a stepping motor 52 is fixed to the side of the gear casing. The shaft 54 of the stepping motor 52 drives a worm gear 56 which in turn drives a pinion gear 58 that is affixed to the bottom of the depending post 40.

As shown in FIGS. 1 and 3, the support column 30 is centered between the molds and the motor driven hinge is positioned so that rotation of the arm 32 will swing the hinge over the center of curvature of either mold 10. The depending leg 26 which supports the chopper and spray head is also adjustably clamped to the outer arm 34 by the clamp bracket 60 so that it can be properly positioned a desired distance away from the surface of the molds. It will now be seen that rotation of the outer arm 34 by the motor driven hinge 36 when the hinge 36 is directly over the center of curvature of one mold will swing the chopper and spray head over the major diameter of the mold which passes through its axis of rotation.

Figure 5:
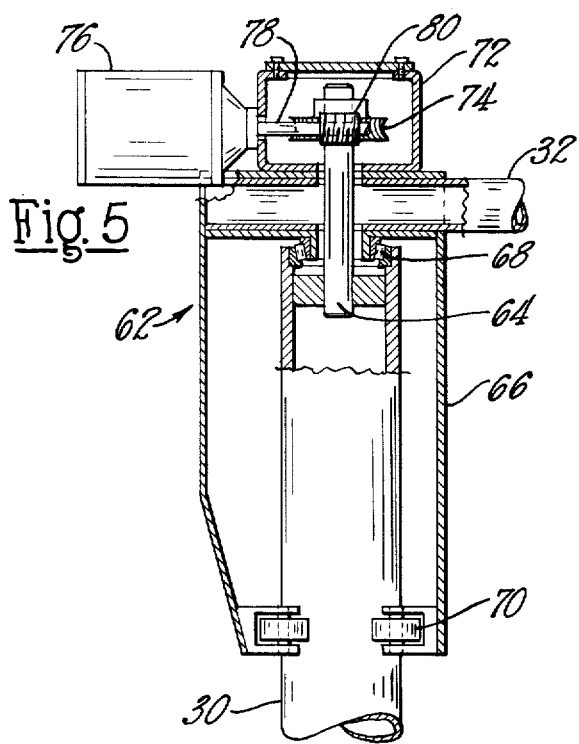
FIG. 5 is a fragmentary sectional view taken approximately on the line 5—5 of FIG. 3.

According to a further aspect of the invention, the spray head and chopper are moved at a velocity which is generally proportional to their distance from the axis of rotation of the mold. The means for accomplishing this variation in movement will later be described with reference to FIG. 6 of the drawings. In some instances the arm 32 can be moved manually from its position for depositing material on one of the forms 10 to its position for depositing material on the other form 10. As shown in the drawing, however, this movement is preferably accomplished by the motor structure 62 shown in FIG. 5.

The motor structure 62 comprises a vertical stationary pin 64 affixed to the top of the vertical support column 30. An elongated cap 66 is fitted over the top of the column 30 and around the pin 64, and the cap 66 is journaled with respect to the column 30 by means of antifriction bearings 68 and 70. A gear housing 72 is fastened to the top of the cap 66 to house a pinion gear 74 that is affixed to the top of the stationary pin 64. A stepping motor 76 is affixed to the outside of the gear housing 72, and the stepping motor shaft 78 drives a worm gear 80 that is in mesh with the pinion gear to rotate the elongated cap 66 about the vertical support column 30. The inner arm 32 extends through the top of the cap 66 and is welded thereto so that rotation of the cap 66 rotates the arm 32.

The apparatus shown in FIG. 2 is generally similar to that shown in FIGS. 1 and 3 and differs principally therefrom in that the external surface of the molds corresponds to dish shaped heads instead of elliptically shaped heads. Those portions of the embodiment shown in FIG. 2 which correspond to portions shown in FIGS. 1 and 3 are designated by a like reference numeral characterized further in that a prime mark is affixed thereto. The molds 10' have a center crown radius, the center of curvature of which is coincident with the axis of the vertical support 30'. The molds 10' also have a knuckle portion which surrounds the crown portion and is tangent thereto. The knuckle portion corresponds in shape to one fourth of a torus. In the plane passing through the axis of rotation of the head, the center 86 of the knuckle radius is a point on the crown radius passing through the point of tangency between the knuckle and crown sections. In FIG. 2 the motor hinge 36' is shown directly over this center of the crown radius. A similar center 86 exists on the other side of the plane, and the centers for the complete knuckle is a circle on the cone formed by the imaginary surface connecting the center of the crown radius with the circle of tangency between the knuckle and crown portions.

In the operation of the structure shown in FIG. 2 the hinge 36' overlies the point 86 and the outer arm 34' begins at a point overlying the largest diameter portion of the mold. Thereafter, the stepping motor 52' is actuated to rotate the hinge 36' at a velocity which is generally inversely proportional to its perpendicular distance from the axis of rotation of the mold. Rotation of the hinge 36' continues until the arm 34' is directly in line with the inner arm 32' at which time the chopper and spray head overlie the point of tangency between the knuckle and crown radius. Thereafter, the stepping motor 52' is stopped and the stepping motor 76' is started so that the entire arm 28' moves about the vertical support 30'. The chopper and spray head increase in velocity until they pass the axis of rotation of the head. Thereafter the chopper and spray head continue, but at a continually reducing velocity until they overlie the point of tangency on the opposite side of the mold. Thereafter the stepping motor 76' stops and the stepping motor 36' starts to move the outer arm 34' to the opposite side of the mold 10'. Thereafter the process is repeated in the reverse direction and the arm reciprocated until a proper thickness of material has been deposited on mold 10'.

In the apparatus shown in FIG. 2, a second mold 10' is also provided at such a position that the radius of curvature for its crown portion is also coincident with the axis of the vertical column 30'. The operation of the articulated arm 28' can be stopped at any time and moved from one mold to the other mold 10'. In the preferred method of operation, however, the chopper and spray head are stopped during the final pass of the outer arm 34' toward the opposite mold 10' and when the arm 34' passes the axis of rotation of the mold 10'. The articulated arm 28' is held extended and is moved past the center of the other mold 10' to the outer most point of tangency, whereupon the stepping motor 76' is stopped and the stepping motor 36' is actuated to move the arm 34' to a beginning position over the major diameter section of the mold 10'. Thereafter it begins a new material deposition cycle similar to that previously described excepting that it is opposite hand. The material deposition cycle for the embodiment shown in FIGS. 1 and 3 is accomplished solely by the oscillation of motor 52' at a velocity generally inversely proportional to its distance form the molds axis of revolution.

In both embodiments of the invention shown in the drawing, the chopper 22 and spray gun 24 are positioned approximately 2 feet from the mold surface, and the chopped fibers and resin are deposited over a width of approximately 18 inches of the mold surface. The stepping motors 52 and 76 are such as to rotate approximately 9° with each impulse, so that each impulse of either stepping motor gives a lateral movement to the chopper and spray head which is considerably less than the spray pattern of resin and fibers. This assures a continuing overlap of the deposits made during each step, and assures that there will be no areas having a deficiency of materials.

Figure 6:
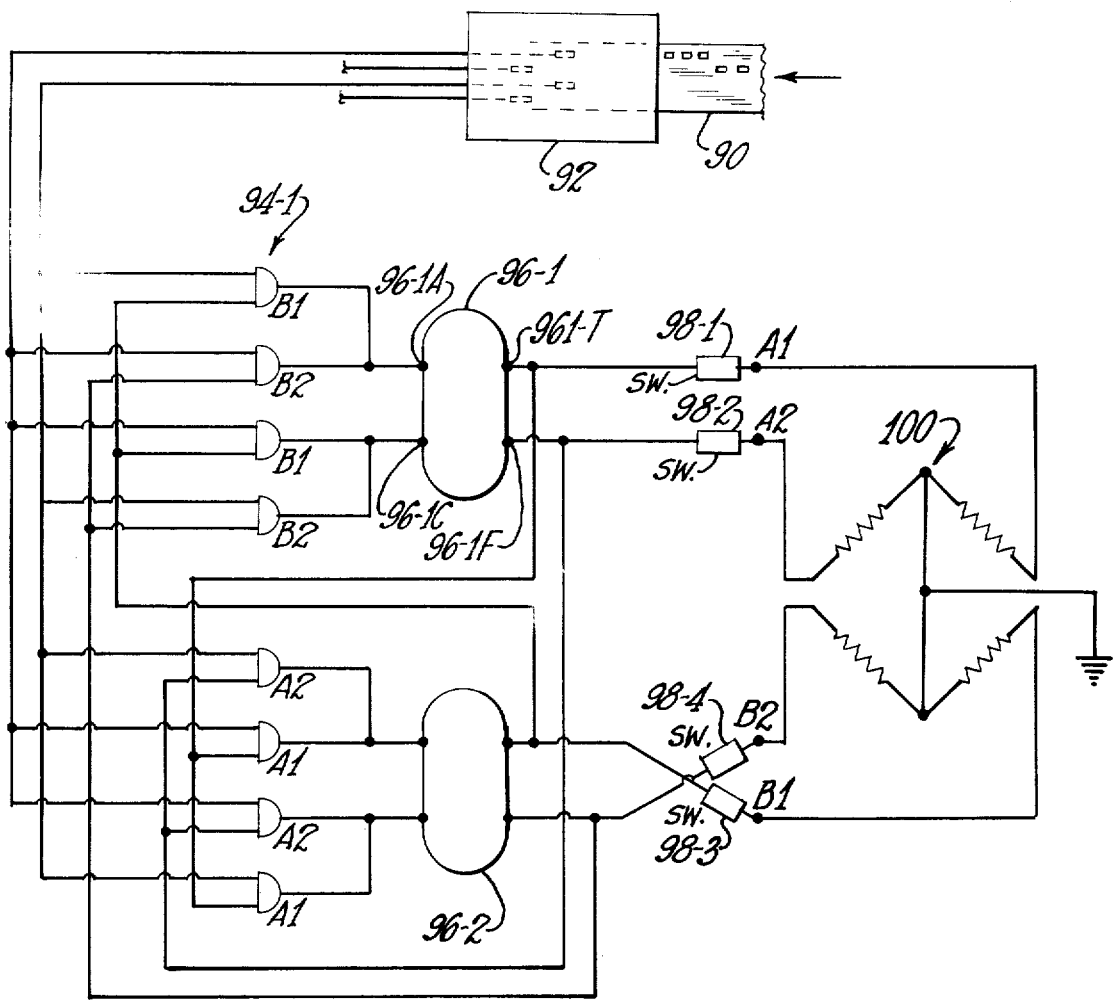
FIG. 6 is a schematic wiring diagram for the apparatus shown in FIGS. 1-3.

FIG. 6 of the drawing shows a preferred method of controlling the stepping motor 52; and the stepping motor 76 is similarly controlled. Indicia for a predetermined program of motor movements is provided on a tape 90, which may be a paper tape having holes therein, or may be a magnetic tape. The tape has 4 columns. Two columns of the tape 90 will be for clockwise movement of the two stepping motors, and the other two columns will be for counterclockwise movement of the stepping motors. In the case shown in the drawing, the tape is a paper tape having holes therein, and contact wheels are provided in the tape reader 92 for providing an impulse to the driving circuits.

The driving circuit for a stepping motor includes 8 and Gates 94-1, 94-2, 94-3, 94-4, 94-5, 94-6, 94-7, and 94-8. The clockwise tape reader for stepper motor 52 is connected to and Gates 94-2, 94-3, 94-6, and 94-7. The counterclockwise tape reader for this stepping motor is connected to the remaining and Gates.

The driving circuit also comprises a pair of flip-flops 96-1 and 96-2. The true output 96-1T of the flip-flop 96-1 is connected to a relay 98-1 which is in turn connected to the input terminal A1 of the coil windings 100 of the stepper motor 52. The flip-flop output 96-1F of the flip-flop 96-1 is connected to relay 98-2 which is in turn connected to the input terminal for the coil A2 of the windings 100. Similarly, the true output 96-2T for the flip-flop 96-2 is connected to the relay 98-3 and which in turn is connected to the coil B1, while the flip-flop output 96-2F is connected to the relay 98-4 which in turn is connected to the coil B2. The level and/or input terminals of the Gates 94-1 and 94-3 are connected to the relay 98-3 and then to the input to coil B1, while the level input for the Gates 94-2 and 94-4 are connected to the relay 98-4 and then to the input to coil B2. The level input terminals for the Gates 94-6 and 94-8 are connected to the input to coil A1, and the level inputs for the Gates 94-5 and 94-7 are connected to the input to coil A2.

Each stepping motor has 2 sets of 4 stator windings designated N1, N2, S1, and S2 making a total of 8 poles with 45° between poles. The rotor of the stepping motor is made by an annular permanent magnet running axially of the shaft, with a disc at the North end of the magnet having 10 poles or teeth and a disc at the South end of the magnet having 10 poles or teeth. The North and South discs are rotated one-half tooth from each other. It will be seen, therefore, that the poles of the armature are 36° apart leaving a difference of 9° between the stator and rotor poles, so that upon changing the energization from 1 pole to the next the rotor moves 9°. The construction of the motor is such that a maximum flux density at N1 is provided when coils A1 and B1 are energized, that a maximum flux density at N2 is provided when coils A2 and B1 are energized, a maximum flux at S1 is provided when A2 and B2 are energized, and a maximum flux at S2 is provided when coils A1 and B2 are energized, as given in Table 1 below.

| N1 | N2 | S1 | S2 |
|----|----|----|----|
| A1 | A2 | A2 | A1 |
| B1 | B1 | B2 | B2 |

Figure 7:
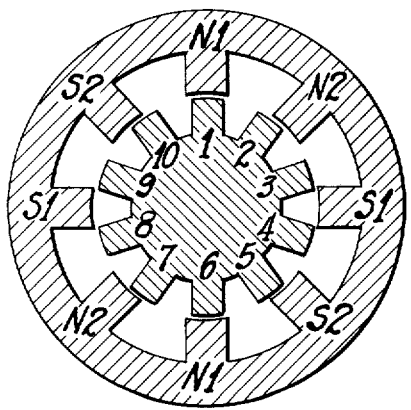
FIG. 7 is a schematic view of the motors used in FIGS. 1-3 and 6.

Referring to Table 1 and FIG. 7, it will be seen that clockwise rotation is had by energizing the coils in the sequence given in Table 1 when reading from left to right, and that counterclockwise rotation is had when providing impulses as given in Table 1 proceeding from right to left.

Referring to the driving circuit and assuming that the motor is in the condition where maximum flux is provided at N1, the operation will now be given to provide clockwise rotation. In the condition indicated, coils A1 and B1 will be energized. The next clockwise pulse will be provided to Gates 94-2, 94-3, 94-6, and 94-7. Since the coil B1 is energized and the coil B2 is not energized, Gate 94-3 will now pass current to the clear terminal 96-1C which thereupon causes the flip-flop to energize output 96-1F and deenergize output 96-1T. This causes the relay 98-2 to energize coil A2. Since coil A2 was not previously energized, the same impulse does not energize and Gate 94-7 whereas 94-6 energizes the set terminal 96-2S of flip-flop 96-2 to cause the flip-flop to energize coil B1 through relay 98-3. This first impulse therefore now causes coils A2 and B1 to be energized as shown in column N2 of the Table.

The second clockwise impulse causes and Gate 94-3 to energize terminal 96-1C of flip-flop 96-1 and thereby again supplying an impulse to coil A2. Gate 94-6 will not be activated, but Gate 94-7 will be activated to energize terminal 96-2C and thereby cause flip-flop 96-2 to deenergize terminal 96-2T and energize terminal 96-2F. This releases coil B1 and energizes coil B2. Coils A2 and B2 will now be energized as shown in Columns S1 of Table 1.

The next clockwise impulse will activate Gate 94-2 but will not activate Gate 94-3, and will activate Gate 94-7 and will not activate Gate 94-6. Gate 94-2 will therefore energize the terminal 96-1S causing flip-flop 96-1 to deenergize output 96-1F and energize output 96-1T and thereby energize coil A1. Activation of Gate 94-7 energizes clear terminal 96-2C to energize flip-flop terminal 96-2F and deenergize terminal 96-2T. Coils A1 and B2 will now be energized to provide maximum flux for coil S2 as shown in the last column of Table 1.

It will also be seen that counterclockwise pulses will energize the coils in the sequence obtained proceeding from right to left in Table 1 to cause the motor to move backwardly. Assuming that the motor is now in its maximum flux condition for S2 and that coils A1 and B2 are energized, the counterclockwise pulse is transmitted to Gates 94-1, 94-4, 94-5, and 94-8. Since B2 is energized, Gate 94-4 becomes conductive to energize clear terminal 96-1C to energize its flip-flop output 96-1F and deenergize its output 96-1T. This deenergizes coil A1 and energizes coil A2. Simultaneously Gate 94-8 is made conductive to energize terminal 96-2C causing the flip-flop to energize its output 96-2F and thereby maintain energization of coil B2. It will now be seen that the motor has moved to the condition shown in Column S1 of Table 1 wherein maximum flux is at S1 to move the motor in a counterclockwise direction. Succeeding counterclockwise impulses can be similarly traced.

It will now be seen that an appropriate program of indicia can be provided on tape 90 to actuate motors 52 and 76 to rotate 52 to coat one mold and then actuate motor 76 to move the arm to the second mold as is necessary to coat the molds shown in FIGS. 1 and 3, or to actuate the motors alternately as has been described with respect to FIG. 2.

It will now be apparent that there has been provided a means for programming the movement of material deposition means over a revolving surface which will cause the material deposition means to speed up as it approaches the center of the revolving surface at a programmed rate which can be designed to give either a uniform thickness of deposited material or a variation from a uniform thickness as may be desired. The structure is such that the movement steps cover a distance that is less than the width over which the deposition takes place, to eliminate voids. The speed of movement is controlled by impulses rather than by a modulation of forces as occurs in the prior art. It will further be seen that the operative structure is positioned out of contact with falling debris and therefore does not become coated with the resins and fibers.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. Apparatus comprising:
    a form having a surface of revolution generated by revolving a curved line about an axis of revolution, and which curved line is made up of at least one circular arc the center of which falls in a first imaginary plane passing through said curved line and said axis of revolution, means rotatably supporting said form about its axis of revolution with the axis of revolution positioned horizontally and with said first imaginary plane being horizontal,
    a first arm positioned above said surface of revolution in a second plane generally parallel to said first plane, support means for rotatably supporting said arm in said second plane for swinging movement about a vertical support axis which is normal to said second plane and which passes through said center of said circular arc, means for rotating said surface of revolution about said axis of revolution, material deposition means supported from said first arm and constructed and arranged to deposit material on the portion of said surface of revolution through which said first imaginary plane passes, drive means for oscillating said first arm to move said deposition means over at least a portion of said curved line, and control means for varying the speed of said drive means to provide a rate of movement which is generally inversely proportional to the distance of said material deposition means from said axis of revolution.

2. The apparatus of claim 1 wherein said form is generated by a curved line having a second circular arc whose center also falls in said first plane, said support means comprising: a second horizontal arm supporting said first arm, said second arm being pivoted about said support axis and being connected to said first arm about a vertical bifurcation axis spaced from said support axis by a distance to pass over said center of said second circular arc, said drive means comprising: a first drive motor for rotating said second arm about said support axis and a second drive motor for producing relative rotation of said arms about said bifurcation axis, said control means programming said second drive means to move said deposition means over said second circular arc while said first drive motor is stationary and then stopping said second drive motor and operating said first drive motor to move said deposition means over said first circular arc.

3. The apparatus of claim 1 wherein said drive means comprises a stepping motor for rotating said arm, and said control means comprises a tape means having a programmed spacing of clockwise and counterclockwise control signals for said stepping motor.

4. The apparatus of claim 3 wherein said support means includes a second arm pivotally supported on an axis generally normal to said plane and supporting said first mentioned arm, and said drive means includes a second stepping motor for rotating said second arm.

5. Apparatus for producing glass fiber reinforced plastic heads for tanks comprising: a form having an exterior surface of revolution corresponding to the shape of head to be produced and an axis of revolution passing therethrough, said form also having a center of curvature for at least a portion of said surface, means rotatably supporting said form for rotation about said axis, spray means for discharging resin and fibers onto said form, an articulated arm rotatably supported about a support axis positioned at generally right angles to said axis of revolution and at a predetermined distance from said center of curvature, said articulated arm having inner and outer arm portions joined by a hinge having an articulation axis parallel to said support axis and spaced from said support axis by a distance generally equal to said predetermined distance, said outer arm supporting said spray means for movement in a plane generally passing through said axis of revolution, means for rotating said articulated arm to bring said hinge generally over said center of curvature, first motor means for rotating said outer arm about said hinge, and control means causing said first motor means to rotate said outer arm at a speed generally inversely proportional to the distance of said spray means from said axis of revolution of said form.

6. The apparatus of claim 5 wherein said form has a knuckle curvature and a crown curvature which are tangent to each other in said plane and said knuckle radius having a center of curvature in said plane, said support axis being located in line with said centers of said crown and knuckle curvatures, said hinge of said articulated arm being spaced from said support axis by a distance equal to said crown radius minus said knuckle radius, second motor means for rotating said inner arm, and said control means causing said first motor means to rotate said hinge to swing said outer arm in line with said inner arm and thereafter stop said first motor means and actuate said second motor means to move said spray means over said crown.

7. Apparatus for depositing material on a surface of revolution comprising: first and second forms each having an external surface of revolution extending about an axis of revolution with means for rotating said forms about their respective axis of revolution, material deposition means, bifurcated support means for moving said deposition means in a plane passing generally through said axes of revolution, said bifurcated support means comprising inner and outer arms with said outer arm pivotedly carried by said inner arm about a bifurcation axis and said inner arm being pivotedly supported about a support axis with both axes being normal to said plane, said forms being located equidistantly from said support axis and each form having at least one center of curvature in said plane, said inner arm being arranged to move said bifurcation axis in an arc passing over each of said centers of curvature of said forms and said outer arm being arranged to swing said material deposition means in an arc about said centers of curvature, drive means for moving said outer arm about said bifurcation axis and for moving said inner arm about said support axis, and control means for varying the speed of said drive means to move said deposition means over each of said forms at a rate which is generally inversely proportional to the distance of said material deposition means from the axis of revolution of the form over which it is moving.

8. The apparatus of claim 7 wherein said axis of revolution of said forms intersects each other on said support axis.

9. The apparatus of claim 8 wherein said forms have both knuckle and crown radii which are tangent, said support axis of said inner arm being spaced from said bifurcation axis for said outer arm by a distance generally equal to the spacing of said center of curvature of said knuckle radius from the center of curvature of said crown radius.

10. Apparatus for producing glass fiber reinforced plastic heads for tanks comprising: a pair of forms each having an exterior surface of revolution corresponding to the shape of head to be produced and an axis of revolution passing therethrough, said forms also having centers of curvature for at least a portion of their surface, means rotatably supporting said forms for rotation about their axes of revolution, spray means for discharging resinous fibers onto said forms, an articulated arm rotatably supported about a support axis positioned at generally right angles to said axes of revolution at their point of intersection, said articulated arm having inner and outer arm portions joined by a hinge having a bifurcation axis parallel to said support axis and spaced from said support axis by a distance generally equal to the spacing of said centers of curvature from said support axis, said outer arm supporting said spray means for movement in a plane generally passing through said axes of revolution, means for rotating said articulated arm to bring said hinge means generally over said centers of curvature, first motor means for rotating said outer arm about said hinge, and control means causing said first motor means to rotate said outer arm to move said spray means at a rate generally inversely proportional to the distance of said spray means from the axis of revolution of the form over which it is situated.

11. The apparatus of claim 10 wherein said forms have a knuckle curvature and a crown curvature which are tangent to each other in said plane with the center of said crown curvatures falling upon said support axes, said knuckle radii also having centers of curvature in said plane, said support axis being located in line with said centers of said crown and knuckle curvatures, said hinge of said articulated arm being spaced from said support axis by a distance equal to said crown radius minus said knuckle radius, second motor means for rotating said inner arm, and said control means causing said first motor means to rotate said hinge to swing said outer arm in line with said inner arm and thereafter stop said first motor means and actuate said second motor means to move said spray means over said crown.

12. Apparatus for producing glass fiber reinforced plastic heads for tanks comprising: a pair of forms each having an exterior surface of revolution corresponding to the shape of head to be produced and an axis of revolution passing therethrough, said forms also having centers of curvature for at least a portion of their surfaces, means rotatably supporting said forms for rotation about said axes of revolution, spray means for discharging resin and fibers onto said forms, an articulated arm rotatably supported about a support axis positioned at generally right angles to said axes of revolution, said forms being positioned with their centers of curvature spaced at a predetermined distance from said support axis, said articulated arm having inner and outer arm portions joined by a hinge having a bifurcation axis parallel to said support axis and spaced from said support axis by a distance generally equal to said predetermined distance, said outer arm supporting said spray means for movement in a plane generally passing through said axes of revolution, means for rotating said articulated arm to swing said hinge generally over said centers of curvature, first motor means for rotating said outer arm about said hinge, and control means causing said first motor means to rotate said outer arm to move said spray means at a speed generally inversely proportional to the distance of said spray means from said axis of revolution of the form over which it is positioned.

13. The apparatus of claim 12 wherein said forms are spherically shaped.

14. The apparatus of claim 12 wherein said means for rotating said inner arm is a second motor means, and said control means functions to rotate said outer arm about the center of curvature of one form, to thereafter actuate said second motor means to bring said hinge over the center of curvature of the other form, and to thereafter actuate said first motor means to rotate said outer arm about the center of curvature of the other form.

15. Apparatus for depositing material on curved surfaces comprising: a pedestal, a generally horizontal inner arm pivotally supported by said pedestal about a generally vertical support axis, a generally horizontal outer arm pivotally supported by said inner arm about a generally vertical hinge axis, a depending leg carried by said outer arm, material deposition means supported by said depending leg and arranged to project material inwardly toward said hinge axis, a pair of stepper motors one for rotating said outer arm about said vertical hinge axis and the other for rotating said inner arm about said vertical support axis, and control means constructed and arranged to actuate said one of said motors to opposite sides of a set position with a speed generally inversely proportional to its distance from said set position.

16. The apparatus of claim 15 wherein said set position occurs at the inline position of said inner and outer arms.

17. The apparatus of claim 15 wherein said control means is constructed and arranged to actuate said one of said arms to move said outer arm a predetermined distance to either side of its inline position with respect to the inner arm at a speed which varies inversely proportionally to the displacement of the outer arm from the inline position, said control means being further constructed and arranged to abruptly stop said one of said motors and start said other of said motors at said inline position of said arms to move said inner arm through a predetermined angle following which it stops said other one of said motors and starts said one of said motors to move said outer arm to the opposite side of said inline condition of said arms.

* * * * *